(12) United States Patent
Panwar

(10) Patent No.: US 11,640,035 B1
(45) Date of Patent: May 2, 2023

(54) OPTICAL FIBRE CABLE FOR AIR BLOWING INSTALLATION

(71) Applicant: Sterlite Technologies Limited, Gurugram (IN)

(72) Inventor: Sourabh Singh Panwar, Gurugram (IN)

(73) Assignee: Sterlite Technologies Limited, Haryana (IN)

( * ) Notice: Subject to any disclaimer, the term of this patent is extended or adjusted under 35 U.S.C. 154(b) by 0 days.

(21) Appl. No.: 17/700,493

(22) Filed: Mar. 22, 2022

(30) Foreign Application Priority Data

Nov. 24, 2021 (IN) .............................. 202111054328

(51) Int. Cl.
*G02B 6/44* (2006.01)
(52) U.S. Cl.
CPC ........... *G02B 6/4464* (2013.01); *G02B 6/443* (2013.01)
(58) Field of Classification Search
None
See application file for complete search history.

(56) References Cited

U.S. PATENT DOCUMENTS

| 9,658,418 | B2 * | 5/2017 | Ceschiat | .............. | G02B 6/4433 |
| 2009/0087153 | A1 * | 4/2009 | Weiss | ................... | G02B 6/4438 |
| | | | | | 385/113 |

* cited by examiner

*Primary Examiner* — Andrew Jordan
(74) *Attorney, Agent, or Firm* — Steven R. Fairchild; Arun Narasani

(57) ABSTRACT

The present disclosure provides an optical fibre cable (100) with high blowing performance. The optical fibre cable (100) includes a plurality of optical fibres (102), a sheath (104) and one or more strength members (106). The sheath (104) envelops the plurality of optical fibres (102). The one or more strength members (106) are embedded in the sheath (104). The one or more strength members (106) embedded in the sheath (104) provides a blowing ratio to the optical fibre cable (100) in a range of about 20 to 45. The blowing ratio is a ratio of cross-sectional area of the sheath (104) to total cross-sectional area of the embedded strength members (106).

13 Claims, 3 Drawing Sheets

OPTICAL FIBRE CABLE FOR AIR BLOWING INSTALLATION

TECHNICAL FIELD

The present disclosure relates to the field of optical fibre and, in particular, relates to an optical fibre cable for air blowing installation.

BACKGROUND

With the advancement of science and technology, various modern technologies are being employed for communication purposes. One of the most important modern communication technologies is the optical fiber communication technology using a variety of optical fiber cables. Optical fiber cables utilize optical fibers to transmit signals such as voice, video, image, data, or information. In general, optical fiber is a flexible transparent fiber manufactured by drawing glass or plastic to a diameter slightly thicker than that of a human hair. In addition, the optical fiber cables may be manufactured with high optical fiber count for high-speed communication purposes. Conventionally, high fiber count optical cables are manufactured with IBR with no rigid strength member present inside a core of the optical cable to maximize free space inside the optical cable. In addition, the strength members are embedded inside a sheath of the optical cables to achieve required tensile strength, stiffness for blowing purpose and environmental tests of the optical cable. However, there is a need to optimize number of embedded strength members inside the sheath of the optical cable to meet above stated requirements.

U.S. Pat. No. 9,069,147,B2 discloses cables having reduced free space, reduced tube diameters, and reduced strength member diameters. The cables are designed to pass robustness testing such as GR-20 while using smaller amounts of raw materials to produce.

CN112867952A discloses an optical fiber cable having a plurality of intermittently connected optical fiber ribbons inside a cable sheath, wherein a fibrous insert or FRP using the fibrous insert is provided on at least 1 diagonal line among 2 diagonal directions substantially orthogonal to each other inside the cable sheath. The fibrous insert has an average coefficient of linear expansion at −40 ° C. to +70 ° C. that is less than the average coefficient of linear expansion of the cable sheath at −40 ° C. to +70 ° C.

JP2020197655A discloses an optical fiber cable having suitable flexural rigidity for air pressure feed in an air pressure feed optical fiber cable. An optical fiber cable 1A comprises: intermittently-coupled type optical fiber ribbons in which coupling parts formed by coupling a portion between adjacent coated optical fibers and non-coupling parts formed by not coupling a portion between adjacent coated optical fibers are intermittently provided in a lengthwise direction in a part of or the whole portion between coated optical fibers; a cable sheath including the plurality of optical fiber ribbons; and two or more tension members provided in such a manner as to be embedded in the cable sheath. A flexural rigidity of the optical fiber cable in a radial direction is 0.3 N m² or more and 1.5 N m² or less in a whole circumferential direction, and a core wire density obtained by dividing the number of core wires of the coated optical fibers by a cable sectional area is 5.0 core wires/mm² or more.

In light of the above-stated discussion, there exists a need for an optical fibre cable with optimized number of embedded strength members that overcomes the above cited drawbacks of the conventional optical fibre cable.

SUMMARY

A primary object of the present disclosure is to provide an optical fibre cable for air blowing installation.

Another object of the present disclosure is to provide the optical fibre cable with embedded strength members.

Yet another object of the present disclosure is to provide the optical fibre cable with high tensile strength.

In an aspect, the present disclosure provides an optical fibre cable with high blowing performance. The optical fibre cable includes a plurality of optical fibres, a sheath and one or more strength members. The sheath envelops the plurality of optical fibres. The one or more strength members are embedded in the sheath. The one or more strength members embedded in the sheath provides a blowing ratio to the optical fibre cable in a range of about 20 to 45. The blowing ratio is a ratio of cross-sectional area of the sheath to total cross-sectional area of the embedded strength members.

BRIEF DESCRIPTION OF THE FIGURES

Figure 1:
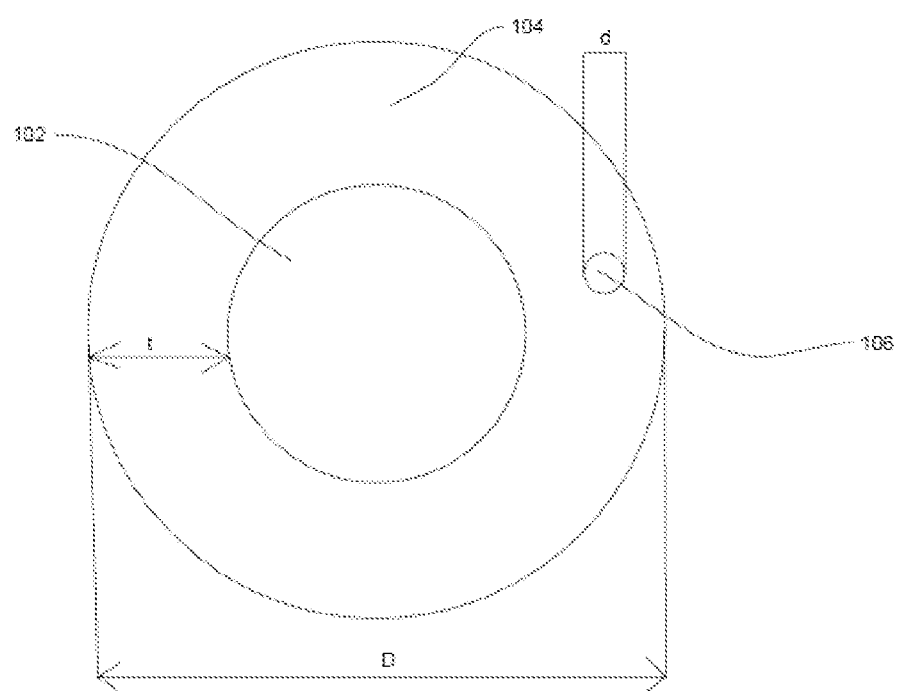
Figure 2:
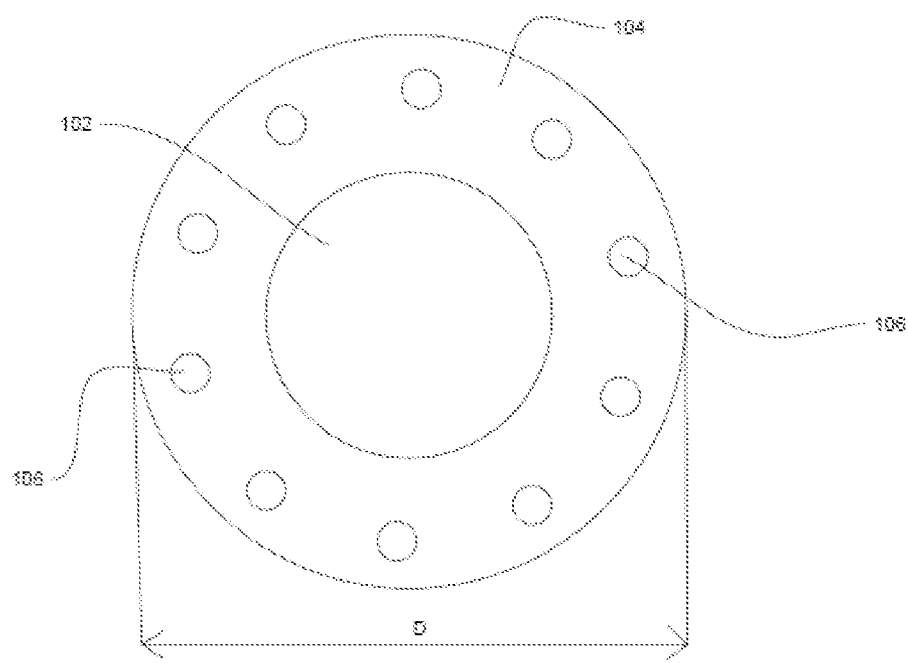
Figure 3:
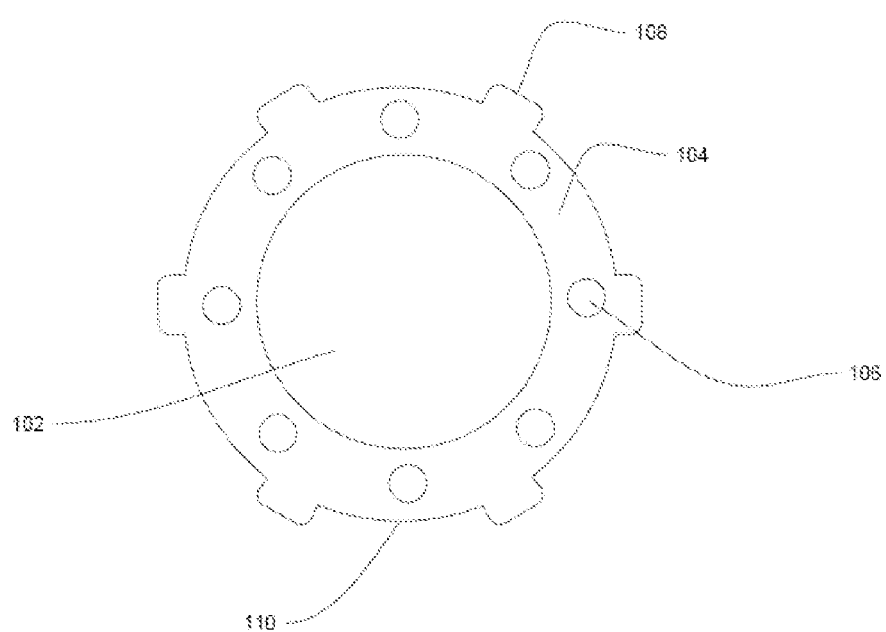

Having thus described the invention in general terms, reference will now be made to the accompanying drawings, which are not necessarily drawn to scale, and wherein:

FIG. 1 illustrates an optical fibre cable, in accordance with an aspect of the present disclosure;

FIG. 2 illustrates the optical fibre cable, in accordance with another aspect of the present disclosure; and FIG. 3 illustrates the optical fibre cable, in accordance with yet another aspect of the present disclosure.

It should be noted that the accompanying figures are intended to present illustrations of exemplary aspects of the present disclosure. These figures are not intended to limit the scope of the present disclosure. It should also be noted that accompanying figures are not necessarily drawn to scale.

DETAILED DESCRIPTION

Reference in this specification to "one aspect" or "an aspect" means that a particular feature, structure, or characteristic described in connection with the aspect is included in at least one aspect of the present technology. The appearance of the phrase "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described which may be requirements for some aspects but no other aspects.

Reference will now be made in detail to selected aspects of the present disclosure in conjunction with accompanying figures. The aspects described herein are not intended to limit the scope of the disclosure, and the present disclosure should not be construed as limited to the aspects described. This disclosure may be embodied in different forms without departing from the scope of the disclosure. It should be understood that the accompanying figures are intended and provided to illustrate aspects of the disclosure described below and are not necessarily drawn to scale. In the drawings, like numbers refer to like elements throughout, and thicknesses and dimensions of some components may be exaggerated for providing better clarity and ease of understanding.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced items.

FIG. 1 illustrates an optical fibre cable 100, in accordance with an aspect of the present disclosure. The optical fibre cable 100 is high fibre count cable. The optical fibre cable 100 has high air blowing performance. In general, optical fibre cable has number of optical fibres bundled together that are covered with protective plastic sheath. The optical fibre cable 100 includes a plurality of optical fibres 102, a sheath 104, and one or more embedded strength members 106.

The optical fibre cable 100 has a diameter D in range of about 7 millimetres to 35 millimetres. In addition, the diameter D of the optical fibre cable 100 may vary. The optical fibre cable 100 includes the plurality of optical fibres 102. In general, optical fibre is used for transmitting information as light pulses from one end to another. In addition, optical fibre is a thin strand of glass or plastic capable of transmitting optical signals. Further, optical fibre is configured to transmit large amount of information over long distances. Furthermore, optical fibre includes a core region and a cladding region. The core region is an inner part of optical fibre and the cladding section is an outer part of optical fibre. In addition, the cladding region surrounds the core region. The plurality of optical fibers 102 corresponds to one of loose optical fibers, and a bundle of optical fibres. In addition, the plurality of optical fibres 102 are arranged in at least one form of intermittent bonded ribbon, flat optical fiber ribbon, and corrugated optical fiber ribbon. The ribbons are stacked or rolled to make fiber ribbon groups. Number of plurality of optical fibres 102 in the optical fibre cable 100 is more than 10,000. Further, the plurality of optical fibers 102 may be placed inside tube or grouped together using a binding element.

In addition, each of the plurality of optical fibres 102 has a diameter of up to 260 micron. Further, each of the plurality of optical fibres 102 has the diameter of 160 micron. Furthermore, each of the plurality of optical fibres 102 has the diameter of 185 micron. Moreover, each of the plurality of optical fibres 102 has the diameter of 200 micron. Also, each of the plurality of optical fibres 102 has the diameter of 250 micron. Also, the diameter of the plurality of optical fibres 102 may vary.

The optical fibre cable 100 includes the sheath 104. The sheath 104 envelops the plurality of optical fibres 102. In an aspect of the present disclosure, the sheath 104 of the optical fibre cable 100 has a thickness in range of about 1.5 millimetres to 3 millimetres. In another aspect of the present disclosure, the thickness of the sheath 104 of the optical fibre cable 100 may vary. The sheath 104 is made of Linear Low Density Polyethylene (LLDPE) material. In addition, the sheath 104 may be made of Low Density Polyethylene (LDPE) material. Further, the sheath 104 may be made of Medium Density Polyethylene (MDPE) material. Furthermore, the sheath 104 may be made of High Density Polyethylene (HDPE) material. Moreover, the sheath 104 may be made of thermoplastic polyurethane (TPU) material. Also, the sheath 104 may be made of polypropylene (PP) material. Also, the sheath 104 may be made of any suitable material of the like. The sheath 104 has a surface. The surface of the sheath 104 is one of a smooth surface, a corrugated surface, or a rough surface.

The optical fibre cable 100 includes the one or more strength members 106. The one or more strength members 106 are embedded in the sheath 104. The one or more strength members 106 corresponds to the embedded strength members 106. The one or more strength members 106 embedded in the sheath 104 provides a blowing ratio in a range of about 20 to 45. The blowing ratio is a ratio of cross-sectional area of the sheath to total cross-sectional area of the embedded strength members 106. In addition, the blowing ratio may vary. The blowing ratio is calculated as:

$$\text{Blowing Ratio} = \frac{A_2}{n * A_1}$$

Where, n=No. of embedded strength members A1—cross-sectional area of 1 strength member A2—cross-sectional area of the sheath Each of the one or more strength members 106 is completely embedded in the sheath 104. Each of the one or more strength members 106 may be partially embedded in the sheath 104.

The one or more strength members 106 are embedded symmetrically in the sheath 104. The sheath 104 is made of a material that has elastic modulus of at least 350 MPa. The sheath 104 may be made of a material that has elastic modulus of around 400 MPa. The sheath 104 may be made of LLDPE material (Linear Low Density Polyethylene). The sheath 104 may be made of LDPE material. The sheath 104 may be made of HDPE material. The sheath 104 may be made of MDPE material. Each of the one or more strength members 106 has a diameter d in range of about 0.5 millimeter to 1 millimeter. The diameter d of each of the one or more strength members 106 may vary.

Each of the one or more strength members 106 are made of ARP (Aramid Reinforcement Plastic) material. In addition, the one or more strength members 106 are made of FRP (fibre reinforced plastic) material. Further, each of the one or more strength members 106 are made of any suitable material of the like.

Number of the strength members 106 embedded in the sheath 104 is optimized. The number of the one or more strength members 106 is optimized irrespective of the number of the plurality of optical fibres 102 in the optical fibre cable 100. The minimum number of the embedded strength members 106 required in the sheath 104 and an area wise is calculated by a formula. The formula is represented as:

$$(\text{Area of PE})_1/(\text{Area of ARP}) \times n_1 = (\text{Area of PE})_2/(\text{Area of ARP}) \times n_2$$

Where, PE refers Polyethylene material of sheath 104 and Area of PE refers to area of the sheath 104. ARP refers to Aramid Reinforcement Plastic material of the one or more strength members 106. Area of ARP refers to the area of the one strength member 106. "n" refers to number of the embedded strength members 106.

In an example, diameter d of the ARP (one strength member) is equal to 0.5 mm and $n_1$ is equal to 10. In addition, the outer diameter D of the optical fibre cable 100 is about 13 millimeters. The outer diameter D of the optical fibre cable 100 may vary. The sheath 104 has a thickness t of about 2 millimeters. The thickness t of the sheath 104 may vary. The area of PE is equal to 69.115 millimeter square and area of one ARP is equal to 0.196 square millimeter. The blowing ratio is calculated as 35. In addition, the diameter d is equal to 1 mm and $n_2$ is equal to 11. In addition, the diameter D of the optical fibre cable 100 is equal to 35 mm and the thickness t of the sheath 104 is equal to 3 mm. The area of PE is equal to 301.59 mm² and area of one ARP is equal to 0.785 mm². The area wise ratio is calculated as 35. From the above formula, since the (Area of PE)$_2$ is known, $n_2$ can be calculated.

From the above example, it is concluded that the optical fibre cable 100 meets tensile requirement, efficient blowing performance and passes environmental test if the ratio of PE area to ARPs area is around 35. The ratio range may be defined from 20 to 45.

The optical fibre cable 100 passes a temperature cycling test. The temperature cycling test is performed to withstand from effects of positive and negative temperature changes mechanically and optically in a range of −40 to +70 degree Celsius. The temperature cycling test is carried out in a temperature-controlled chamber with a soak time of 0.5 to 24 hours at both the extreme temperature conditions for at least 2 cycles. The optical fibre cable 100 has a tensile strength of more than 1000 Newton. The tensile strength of the optical fibre cable 100 may vary.

FIG. 2 illustrates the optical fibre cable 100, in accordance with an aspect of the present disclosure. The optical fibre cable 100 of FIG. 2 includes the plurality of optical fibres 102, the sheath 104, and the one or more embedded strength members 106. The number of the one or more embedded strength members 106 is 10 (as shown in FIG. 2). The number of the one or more strength members 106 is 8. The number of the embedded strength members 106 may be in range of about 8 to 10. The number of the embedded strength members 106 may be in range of 4 to 16. The number of the embedded strength members 106 may vary. In addition, the optical fibre cable 100 has the diameter D in range of about 7 millimetres to 35 millimetres. The diameter D of the optical fibre cable 100 may vary.

FIG. 3 illustrates the optical fibre cable 100, in accordance with yet another aspect of the present disclosure. The optical fibre cable 100 of FIG. 3 is a ribbed and grooved cable. The sheath 104 includes an inner surface and an outer surface. In general, sheath is an outer layer of a cable that protects the cable from environmental conditions. In addition, the environment conditions include but may not be limited to rainfall, sunlight, snowfall, and wind. The outer surface of the sheath 104 is a smooth surface. The outer surface of the sheath 104 may have a corrugated surface. The outer surface of the sheath 104 may have a rough surface.

The sheath 104 of the cable 100 includes a plurality of ribs 108 and a plurality of grooves 110. The plurality of ribs 108 and the plurality of grooves 110 are formed on the outer surface of the sheath 104. Number of the plurality of ribs 108 is same as number of the plurality of grooves 110. The plurality of ribs 108 and the plurality of grooves 110 reduce coefficient of friction between the sheath 104 and a duct. The optical fibre cable 100 has a coefficient of friction between an outer surface of the sheath 104 and an inner surface of a duct of less than or equal to 0.12. The coefficient of friction may vary.

The plurality of ribs 108 and the plurality of grooves 110 are arranged alternately to each other on the outer surface of the sheath 104. In an example, a groove of the plurality of grooves 110 is present on both sides of each rib of the plurality of ribs 108. In another example, a rib of the plurality of ribs 108 is present on both sides of each groove of the plurality of grooves 110. Height of each of the plurality of ribs 108 is equal. The height of each of the plurality of grooves 110 is equal.

The optical fibre cable 100 (as shown in FIG. 1, FIG. 2, and FIG. 3) has bending stiffness of more than 0.20 Newton per meter square. The bending stiffness of the optical fibre cable 100 may vary. The optical fibre cable 100 is capable of being blown to a distance of at least 1000 meters in the duct. The optical fibre cable 100 is blown in the duct with an average speed of at least 60 meters per minute with air pressure of less than 15 bar with a duct fill ratio of 35% to 65%. The duct fill ratio is the ratio between cable and duct size. In addition, the duct fill ratio is the ratio between cross sectional area of cable and inner space of the duct and is calculated as:

$$DFR = \frac{d^2}{D^2} \times 100$$

Where, d=cable diameter D=duct inner diameter

Further, the optical fibre cable 100 is capable of being blown to a distance of at least 1200 meter in the duct with the duct fill ratio of 35% to 65%. The duct fill ratio may vary. Furthermore, the optical fibre cable 100 with the blowing ratio of 20 to 45 is capable of being blown to a distance of at least 1500 meter in the duct. Moreover, the optical fibre cable 100 has the tensile strength of more than 1000 Newton.

The foregoing descriptions of pre-defined aspects of the present technology have been presented for purposes of illustration and description. They are not intended to be exhaustive or to limit the present technology to the precise forms disclosed, and obviously many modifications and variations are possible in light of the above teaching. The aspects were chosen and described in order to best explain the principles of the present technology and its practical application, to thereby enable others skilled in the art to best utilize the present technology and various aspects with various modifications as are suited to the particular use contemplated. It is understood that various omissions and substitutions of equivalents are contemplated as circumstance may suggest or render expedient, but such are intended to cover the application or implementation without departing from the scope of the claims of the present technology.

I claim:

1. An optical fibre cable (100) for air blowing installation, the optical fibre cable (100) comprising:
    a plurality of optical fibres (102);
    a sheath (104), wherein the sheath (104) envelops the plurality of optical fibres (102); and
    one or more strength members (106), wherein the one or more strength members (106) are embedded in the sheath (104), wherein the one or more strength members (106) embedded in the sheath (104) provides a blowing ratio to the optical fibre cable (100) in a range of about 20 to 45, wherein the blowing ratio is a ratio of cross-sectional area of the sheath (104) to cross-sectional area of the one or more strength members (106).

2. The optical fibre cable (100) as claimed in claim 1, wherein the plurality of optical fibres (102) corresponds to one of loose optical fibres, intermittent bonded ribbons, flat optical fibre ribbons, and corrugated optical fibre ribbons.

3. The optical fibre cable (100) as claimed in claim 1, wherein each of the one or more strength members (106) is completely embedded in the sheath (104).

4. The optical fibre cable (100) as claimed in claim 1, wherein each of the one or more strength members (106) is partially embedded in the sheath (104).

5. The optical fibre cable (100) as claimed in claim 1, wherein number of the strength members (106) embedded in the sheath (104) is 4 to 16.

6. The optical fibre cable (100) as claimed in claim 1, wherein the optical fibre cable (100) is capable of being blown to a distance of at least 1000 meters in a duct, wherein the optical fibre cable (100) is blown in the duct with an average speed of at least 60 meters per minute with air pressure of less than 15 bar with a duct fill ratio of.

7. The optical fibre cable (100) as claimed in claim 1, wherein the strength members (106) are embedded symmetrically in the sheath (104).

8. The optical fibre cable (100) as claimed in claim 1, wherein the sheath (104) is made of a material that has elastic modulus of at least 350 MPa.

9. The optical fibre cable (100) as claimed in claim 1, wherein the sheath (104) has a surface, wherein the surface of the sheath (104) is one of a smooth surface, a corrugated surface, or a rough surface.

10. The optical fibre cable (100) as claimed in claim 1, wherein the optical fibre cable (100) has bending stiffness of more than 0.20 Newton per meter square.

11. The optical fibre cable (100) as claimed in claim 1, wherein the optical fibre cable (100) has a coefficient of friction between an outer surface of the sheath (104) and an inner surface of a duct of less than or equal to 0.12.

12. The optical fibre cable (100) as claimed in claim 1, wherein the optical fibre cable (100) is capable of being blown to a distance of at least 1200 meter in a duct with a duct fill ratio of 35% to 65%.

13. The optical fibre cable (100) as claimed in claim 1, wherein the optical fibre cable (100) with the blowing ratio of 20 to 45 is capable of being blown to a distance of at least 1500 meter in a duct.

* * * * *